United States Patent
Chang et al.

(10) Patent No.: US 12,183,043 B2
(45) Date of Patent: Dec. 31, 2024

(54) RATE CONTROLLED IMAGE AND TEXTURE DATA COMPRESSION

(71) Applicant: Meta Platforms Technologies, LLC, Menlo Park, CA (US)

(72) Inventors: Cheng Chang, Redmond, WA (US); Zhi Zhou, Issaquah, WA (US); Richard Webb, Sammamish, WA (US); Richard Lawrence Greene, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/182,029

(22) Filed: Mar. 10, 2023

(65) Prior Publication Data

US 2023/0215054 A1    Jul. 6, 2023

Related U.S. Application Data

(63) Continuation of application No. 17/003,575, filed on Aug. 26, 2020, now Pat. No. 11,670,009.

(51) Int. Cl.
| | |
|---|---|
| *G06T 9/00* | (2006.01) |
| *G06T 1/60* | (2006.01) |
| *H04N 19/115* | (2014.01) |
| *H04N 19/146* | (2014.01) |
| *H04N 19/157* | (2014.01) |
| *H04N 19/184* | (2014.01) |

(52) U.S. Cl.
CPC ................. *G06T 9/00* (2013.01); *G06T 1/60* (2013.01); *H04N 19/115* (2014.11); *H04N 19/146* (2014.11); *H04N 19/157* (2014.11); *H04N 19/184* (2014.11)

(58) Field of Classification Search
CPC ........... G06T 9/00; G06T 1/60; H04N 19/115; H04N 19/146; H04N 19/157; H04N 19/184; H04N 19/21
See application file for complete search history.

(56) References Cited

U.S. PATENT DOCUMENTS

| | | | |
|---|---|---|---|
| 2004/0022316 A1* | 2/2004 | Ueda ..................... | H04N 19/177 375/E7.181 |
| 2013/0010864 A1* | 1/2013 | Teng ..................... | H04N 19/172 375/E7.258 |
| 2015/0138229 A1* | 5/2015 | Ghosh ..................... | G09G 5/36 345/629 |

(Continued)

*Primary Examiner* — Tracy Y. Li
(74) *Attorney, Agent, or Firm* — Greenberg Traurig, LLP

(57) ABSTRACT

A computing system may access first alpha values associated with first pixels in a first pixel region of an image and determine a bit budget for encoding the first alpha values. The computing system may then select a first alpha-encoding mode for the first alpha values to reflect a determination that the first alpha values are all fully transparent or all fully opaque, and encode the first alpha values by storing the selected first alpha-encoding mode as part of a metadata without using the bit budget to encode the first alpha values individually. The computing system may then update a record of unallocated bits available for allocation based on the bit budget unused in the encoding of the first alpha values, and allocate, based on the record of unallocated bits, bits to encode a set of alpha values different from the first alpha values.

20 Claims, 10 Drawing Sheets

(56) References Cited

U.S. PATENT DOCUMENTS

| | | | |
|---|---|---|---|
| 2016/0065977 A1* | 3/2016 | Kimura | H04N 19/187 375/240.01 |
| 2020/0007156 A1* | 1/2020 | Fenney | G06T 1/60 |
| 2020/0050451 A1* | 2/2020 | Babich | G06F 15/163 |
| 2021/0350605 A1* | 11/2021 | Chen | H04N 19/176 |

* cited by examiner

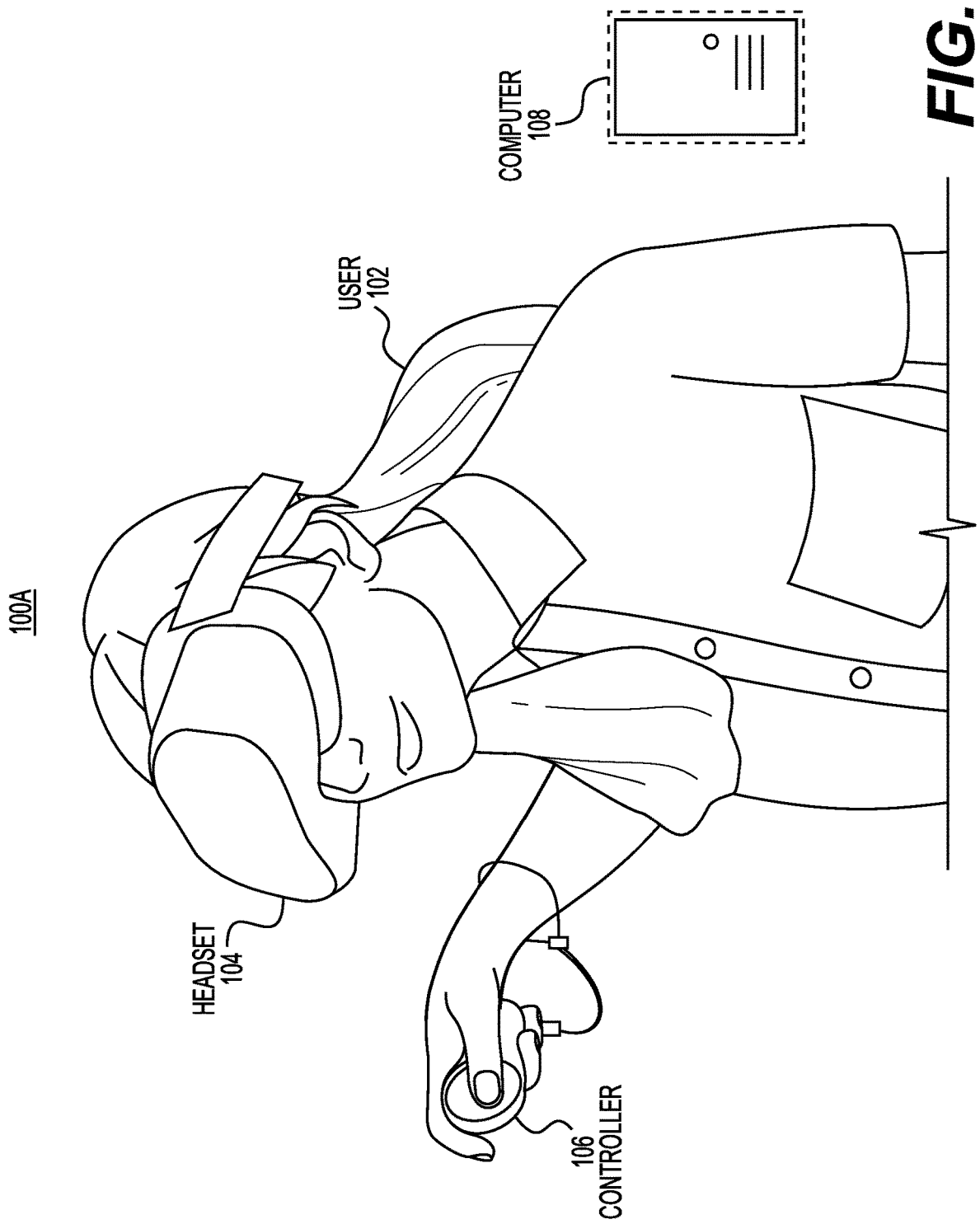

| ALPHA MODE | DESCRIPTION |
|---|---|
| 00 | TRANSPARENT BLOCK - ALL ALPHA SAMPLES == 0 |
| 01 | OPAQUE BLOCK - ALL ALPHA SAMPLES == 255 |
| 10 | FULL RANGE BLOCK - ENDPOINTS SELECTED AS 0 AND 255, RESPECTIVELY. |
| 11 | ALPHA BLOCK - DETERMINE PRECISION AND ENDPOINTS |

RATE CONTROLLED IMAGE AND TEXTURE DATA COMPRESSION

PRIORITY

This application is a continuation under 35 U.S.C. § 120 of U.S. patent application Ser. No. 17/003,575, filed 26 Aug. 2020, which is incorporated herein by reference.

TECHNICAL FIELD

This disclosure generally relates to data compression, and, more specifically, to rate controlled image and texture data compression.

BACKGROUND

Textures may generally include two-dimensional (2D) images that map to a three-dimensional (3D) surface, in which the individual pixels of the texture images may be referred to as "texels" (e.g., texture elements). For example, during graphics rendering, the textures of visible objects are sampled to generate a final image for display. However, artificial reality (e.g., augmented reality [AR], virtual reality [VR]) headsets may include one or more display lenses that causes different wavelengths of light to have different focal lengths. This may lead to visual artifacts, such as chromatic aberration becoming apparent on the displays of the artificial reality headset. For example, chromatic aberration may include different color channels of a pixel in the original rendered image not being projected onto the same corresponding location in the user's eyes when the image is displayed. Thus, it may be useful to provide techniques to compensate for chromatic aberration.

SUMMARY OF PARTICULAR EMBODIMENTS

The present embodiments are directed to techniques for (1) encoding individual color components separately and (2) providing a compression rate control method of allocating available bits to different (R)ed, (G)reen, (B)lue color components based on the amount of color information included in each of the RGB color components of each pixel per pixel block. In certain embodiments, an encoder device may access color components of a pixel region in an image. For example, in one embodiment, the image may include an N-bit color image (e.g., 8-bit color image), which may include RGB color components to be compressed and stored and/or transmitted. The encoder device may then determine a color variance for each of the color components of the pixel region. For example, in certain embodiments, the encoder device may perform a pre-analysis of the of the N-bit color image (e.g., on a pixel region by pixel region basis) and determine a mean (e.g., an average of the total pixel value) and a variance (e.g., a measure of the average degree to which each RGB color component is different from the mean value) with respect to each of the RGB color components of each pixel per pixel region.

In certain embodiments, the encoder device may then determine a desired bit allocation for each of the color components of the pixel region based on the color variance associated with that color component. For example, in some embodiments, the encoder device may determine a desired bit allocation [x, y, z] (e.g., x—corresponding to the all of the red color components of the pixel region; y—corresponding to the all of the green color components of the pixel region; and z—corresponding to the all of the blue color components of the pixel region) for encoding each of the RGB color components of the pixel region based on the color variance associated with each of the RGB color components. The encoder device may then determine a total bit allocation budget for the pixel region based on the desired bit allocation for the color components of the pixel region and a number of unallocated bits available for allocation.

For example, in some embodiments, the encoder device may determine the total bit allocation budget based on a sum (e.g., N=bit allocation budget+number of unallocated bits available for allocation) of the desired bit allocations for each of the RGB color components of the pixel region (e.g., x, y, z) and the number of unallocated bits available for allocation (e.g., bits). The encoder device may then determine a final bit allocation for each of the color components by allocating the total bit allocation for the pixel region to each of the color components of the pixel region according to the desired bit allocation for each of the color components. For example, in certain embodiments, the encoder device may determine the final bit allocation by comparing, for example, the number of unallocated bits available for allocation (e.g., N bits) to the desired bit allocation [x, y, z]. Specifically, in some embodiments, the number of unallocated bits available for allocation may correspond to a predetermined bit allocation budget (e.g., N bpp) for the pixel region.

In some embodiments, in response to determining that a sum of the desired bit allocations (e.g., x, y, z) for each of the RGB color components is less than or equal to the bit allocation budget (e.g., N bpp) for the pixel region, the encoder device may encode each of the color components of the pixel region using the final bit allocation. For example, when the sum of the desired bit allocations (e.g., x, y, z) for each of the RGB color components is less than or equal to the bit allocation budget (e.g., N bpp), the final bit allocation may correspond to the desired bit allocation [x, y, z]. Accordingly, the bit allocation budget of N bits may be distributed to each of the RGB color components for the pixel region to correspond to the desired bit allocation [x, y, z].

The present embodiments further provide techniques for efficiently and optimally selecting quantization levels that provide the least amount of quantization error to improve visual quality. In certain embodiments, the encoder device may determine a bit depth for encoding one or more color components of a pixel region in an image, in which the one or more color components includes a color range. For example, in one embodiment, the image may include an N-bit color image, which may include RGB color components to be separately and independently encoded and compressed. The encoder device may then determine a quantization range having a first quantization endpoint and a second quantization endpoint.

In some embodiments, for calculation of the first quantization endpoint, the encoder device may fix the second quantization endpoint to an initial value determined based on the color range, and then select one of a plurality of first candidate values for the first quantization endpoint based on a plurality of corresponding first quantization errors over an entire pixel block. Similarly, for calculation of the second quantization endpoint, the encoder device may fix the first quantization endpoint to the selected first candidate value for the first quantization endpoint, and then select one of a plurality of second candidate values for the second quantization endpoint based on a plurality of corresponding second quantization errors. For example, in certain embodiments, the encoder device may perform, for example, a divide-and-conquer algorithm to identify the most optimal quantization value for the first quantization endpoint (e.g., most optimal lowest quantization value for the quantization range) while the second quantization endpoint (e.g., most optimal highest quantization value for the quantization range) is fixed to a predetermined value. Specifically, in some embodiments, performing the divide-and-conquer algorithm, for example, may include first determining a minimum color value and a maximum color value for the color range of the red color component, the green color component, or the blue color component. The encoder device may then fix the second quantization endpoint to the maximum color value of the particular color component range (e.g., separate color range for the red color component, separate color range for the green component, or separate color range for the blue component).

In certain embodiments, the encoder device may then enumerate all possible pixel values of the first quantization endpoint to identify the most optimal quantization value for the first quantization endpoint. The encoder device may then calculate the quantization error for each of the identified possible quantization values for the first quantization endpoint, and then select the quantization value with the least amount of quantization error. For example, in one embodiment, the quantization value of the first quantization endpoint may be determined and selected based on an M number of trials of differing quantization values for the first quantization endpoint while the second quantization endpoint remains fixed to the maximum color value. In one embodiment, the M number of trials of differing quantization values for the first quantization endpoint may be spaced by a calculated quantization step size.

In some embodiments, upon determining and selecting the most optimal pixel value of the first quantization endpoint, the encoder device may then proceed in determining and selecting the most optimal quantization value of the second quantization endpoint by enumerating all possible quantization values for the second quantization endpoint while the first quantization endpoint remains fixed at the determined and selected the most optimal quantization value of the first quantization endpoint. In one embodiment, the second quantization endpoint may be determined and selected based on N−1 number of trials of differing pixel values for the second quantization endpoint.

In other embodiments, to determine the first quantization endpoint and the second quantization endpoint, the encoder device may perform, for example, an exhaustive search algorithm (e.g., brute force) in which all possible combinations for the first quantization endpoint and the second quantization endpoint are enumerated to identify the most optimal quantization values for the first quantization endpoint and the second quantization endpoint. Specifically, if there are M possible selections for the first quantization endpoint and N possible selections for the second quantization endpoint, the encoder device may select the most optimal quantization value of each of the first quantization endpoint and the second quantization endpoint by calculating the quantization error for all M*N combinations, and then selecting the particular M*N combination with the least amount of quantization error.

In certain embodiments, following the selection and determination of the most optimal quantization values for the first quantization endpoint (e.g., most optimal lowest quantization value for the quantization range) and the second quantization endpoint (e.g., most optimal highest quantization value for the quantization range), the encoder device may define quantization levels corresponding to the bit depth using the quantization range defined by the first quantization endpoint and the second quantization endpoint. For example, in one embodiment, the intervening quantization levels may then be selected as equally spaced quantization values (e.g., equally spaced based on a calculated quantization step size) between the first quantization endpoint and the second quantization endpoint, forming the range of quantization levels corresponding to the bit depth for the one or more color components. The encoder device may then encode the one or more color components of the pixel region using the determined quantization levels.

The present embodiments further include techniques for selectively performing a compression rate control method of allocating available bits to different alpha components that may be utilized to reduce memory consumption and decrease network bandwidth and reduce data transmission latency. In certain embodiments, the encoder device may access first alpha values associated with first pixels in a first pixel region of an N-bit color image (e.g., 8-bit color image). The encoder device may then determine a bit budget for encoding the first alpha values. For example, in some embodiments, a fixed-point representation may be used to determine a bit budget for each alpha channel component per pixel block. For example, because the encoder device may not utilize many bits to, for example, mask out foreground and background pixels, only quantization values up to 4 bits may be utilized. Thus, in some embodiments, the encoder device may determine, for example, an average fixed-point an alpha allocation budget of 2.67 bpp.

In certain embodiments, the encoder device may then select a first alpha-encoding mode for the first alpha values to reflect a determination that the first alpha values are all fully transparent or all fully opaque. For example, in some embodiments, for alpha-encoding modes corresponding to a predetermined "Transparent mode" or an "Opaque mode", all of the alpha components in the pixel block may be determined by the encoder device to be "0" alpha value when in the "Transparent mode") and "255" alpha value when in "Opaque mode"). The encoder device may then encode the first alpha values by storing the selected first alpha-encoding mode as part of metadata associated with the first pixel region without using the bit budget to encode the first alpha values individually. For example, when the encoder device determines that the first alpha values are all fully transparent or all fully opaque, the encoder device may not encode the alpha components, and may instead store as metadata one or more 2-bit alpha-encoding mode signifiers indicating that the first alpha values are all fully transparent or all fully opaque.

In certain embodiments, the encoder device may then update a record of unallocated bits available for allocation based on the bit budget unused in the encoding of the first alpha values. For example, the encoder device may increment the record of unallocated bits alpha allocation budget of 2.67 bits (e.g., bits unused from the determined alpha allocation budget of 2.67 bpp). The encoder device may then allocate, based on the record of unallocated bits, one or more bits to encode a set of alpha values different from the first alpha values. For example, the bits unused (e.g., 2.67 bits) from the determined alpha allocation budget of 2.67 bpp may be recorded and allocated for encoding the alpha values of one or more other color components, for example.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1A illustrates an example artificial reality system.
FIG. 7 is a table diagram that illustrates one or more predetermined alpha-encoding modes for selectively performing a compression rate control method of allocating available bits to different alpha components.

DESCRIPTION OF EXAMPLE EMBODIMENTS

Figure 1B:
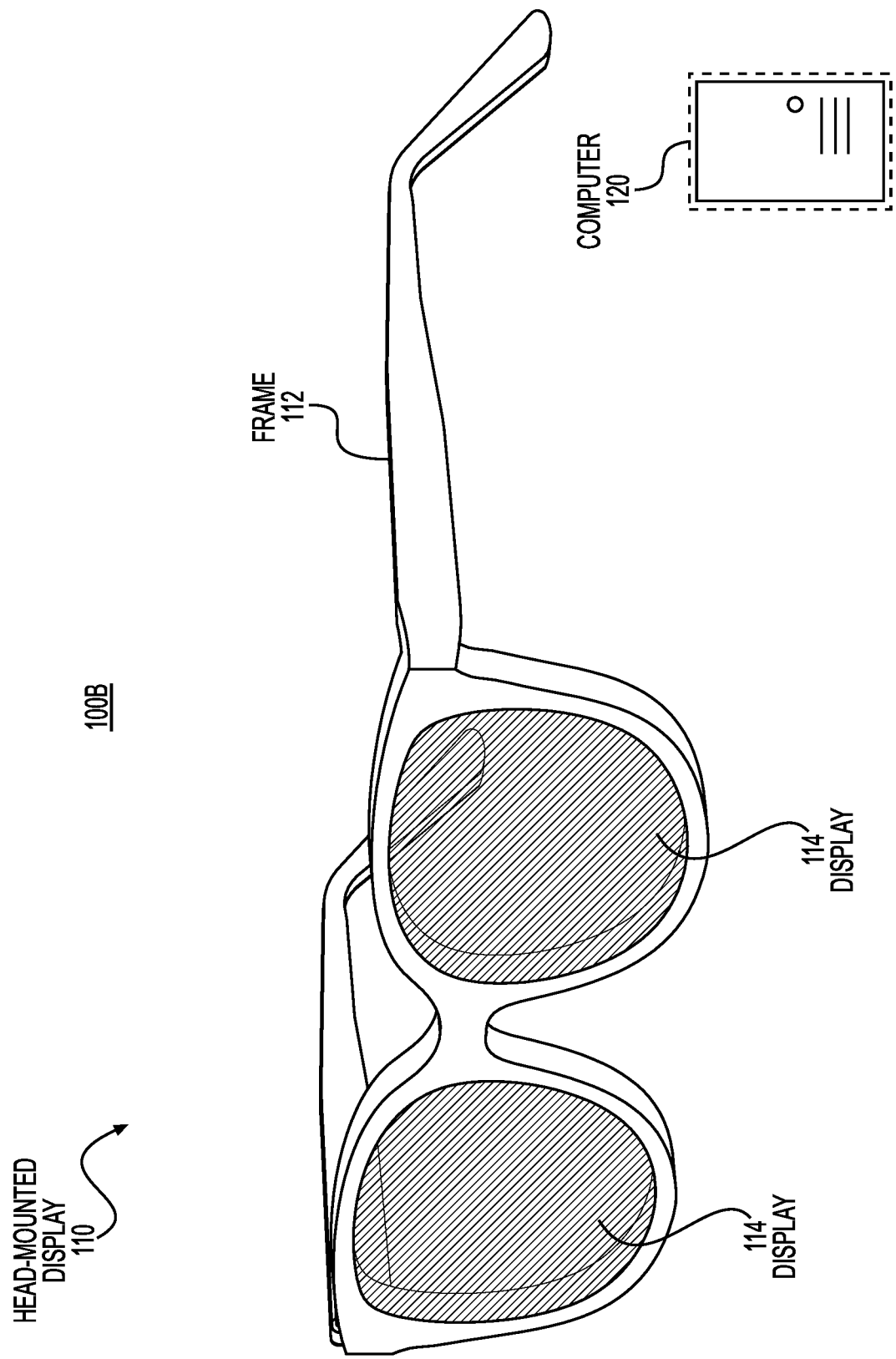
FIG. 1B illustrates an example augmented reality system.

Textures may generally include two-dimensional (2D) images that map to a three-dimensional (3D) surface, in which the individual pixels of the texture images may be referred to as "texels" (e.g., texture elements). For example, during graphics rendering, the textures of visible objects are sampled to generate a final image for display. However, artificial reality (e.g., augmented reality [AV], virtual reality [VR]) headsets may include one or more display lenses that causes different wavelengths of light to have different focal lengths. This may lead to visual artifacts, such as chromatic aberration becoming apparent on the displays of the artificial reality headset. For example, chromatic aberration may include different color channels of a pixel in the original rendered image not being projected onto the same corresponding location in the user's eyes when the image is displayed. Thus, it may be useful to compensate for chromatic aberration before the rendered image is displayed.

One particularly useful technique for compensating for chromatic aberration may include a per-color-channel compensation scheme, where each color channel is individually rendered so that the physics properties of different wavelengths could be individually modelled. For example, when rays are cast to determine object visibility, each visibility ray may represent a particular color channel (e.g., RGB) and mimic the properties of the corresponding wavelength. This means that when the texture is being sampled for a particular ray, the rendering system would need the color information corresponding to the particular color channel represented by the ray. Previous texture compression techniques including, for example, Block Compression (e.g., BC1, BC2, BC3, BC4, BC5, BC6H, BC7), Adaptive Scalable Texture Compression (ASTC), DirectX Texture Compression (e.g., DXT1, DXT2, DXT3, DXT4, DXT5), and so forth may generally encode the color channels of a particular pixel concurrently. For example, when a red color at a particular pixel location (x, y) is to be accessed, each of the 3 RGB color channels are decoded concurrently at the particular pixel location (x, y) and the green and blue color channels are discarded. As it may be appreciated, such techniques may unnecessarily increase memory consumption, power consumption, and computational costs.

Furthermore, during texture compression, to minimize quantization error and to improve visual quality, the quantization levels may be carefully selected, as they directly influence quantization errors. To compensate, previous texture compression techniques included naïvely selecting the endpoints of a range of quantization bins as the respective minimum and maximum color values per pixel per pixel block. The remaining quantization levels occurring in the range between the endpoints would then be evenly distributed within the endpoints. However, selecting the endpoints as the respective minimum and maximum quantization values may, in many instances, lead to higher than acceptable distortion of the pixels and the overall degradation of the quality of the compressed image. Still further, the alpha channel may generally include data characteristics or properties that are markedly distinct from those of the RGB color channels. Thus, texture compression techniques that may be suitable for encoding and decoding pixel blocks of RGB color channels may be particularly unsuitable for encoding and decoding alpha channel pixel blocks. The present techniques are provided to overcome the forgoing.

Indeed, the present embodiments are directed to techniques for (1) encoding individual color components separately and (2) providing a compression rate control method of allocating available bits to different (R)ed, (G)reen, (B)lue color components based on the amount of color information included in each of the RGB color components of each pixel per pixel block. In certain embodiments, an encoder device may access color components of a pixel region in an image. For example, in one embodiment, the image may include an N-bit color image (e.g., 8-bit color image), which may include RGB color components to be compressed and stored and/or transmitted. The encoder device may then determine a color variance for each of the color components of the pixel region. For example, in certain embodiments, the encoder device may perform a pre-analysis of the of the N-bit color image (e.g., on a pixel region by pixel region basis) and determine a mean (e.g., an average of the total pixel value) and a variance (e.g., a measure of the average degree to which each RGB color component is different from the mean value) with respect to each of the RGB color components of each pixel per pixel region.

In certain embodiments, the encoder device may then determine a desired bit allocation for each of the color components of the pixel region based on the color variance associated with that color component. For example, in some embodiments, the encoder device may determine a desired bit allocation [x, y, z] (e.g., x—corresponding to the all of the red color components of the pixel region; y—corresponding to the all of the green color components of the pixel region; and z—corresponding to the all of the blue color components of the pixel region) for encoding each of the RGB color components of the pixel region based on the color variance associated with each of the RGB color components. The encoder device may then determine a total bit allocation budget for the pixel region based on the desired bit allocation for the color components of the pixel region and a number of unallocated bits available for allocation.

For example, in some embodiments, the encoder device may determine the total bit allocation budget based on a sum (e.g., N=bit allocation budget+number of unallocated bits available for allocation) of the desired bit allocations for each of the RGB color components of the pixel region (e.g., x, y, z) and the number of unallocated bits available for allocation. The encoder device may then determine a final bit allocation for each of the color components by allocating the total bit allocation for the pixel region to each of the color components of the pixel region according to the desired bit allocation for each of the color components. For example, in certain embodiments, the encoder device may determine the final bit allocation by comparing, for example, the number of unallocated bits available for allocation to the desired bit allocation [x, y, z]. Specifically, in some embodiments, the number of unallocated bits available for allocation may correspond to a predetermined bit allocation budget (e.g., N bpp) for the pixel region.

In some embodiments, in response to determining that a sum of the desired bit allocations (e.g., x, y, z) for each of the RGB color components is less than or equal to the bit allocation budget (e.g., N bpp) for the pixel region, the encoder device may encode each of the color components of the pixel region using the final bit allocation. For example, when the sum of the desired bit allocations (e.g., x, y, z) for each of the RGB color components is less than or equal to the bit allocation budget (e.g., N bpp), the final bit allocation may correspond to the desired bit allocation [x, y, z]. Accordingly, the bit allocation budget of N bits may be distributed to each of the RGB color components for the pixel region to correspond to the desired bit allocation [x, y, z].

The present embodiments further provide techniques for efficiently and optimally selecting quantization levels that provide the least amount of quantization error to improve visual quality. In certain embodiments, the encoder device may determine a bit depth for encoding one or more color components of a pixel region in an image, in which the one or more color components includes a color range. For example, in one embodiment, the image may include an N-bit color image, which may include RGB color components to be separately and independently encoded and compressed. The encoder device may then determine a quantization range having a first quantization endpoint and a second quantization endpoint.

In some embodiments, for calculation of the first quantization endpoint, the encoder device may fix the second quantization endpoint to an initial value determined based on the color range, at then select one of a plurality of first candidate values for the first quantization endpoint based on a plurality of corresponding first quantization errors. Similarly, for calculation of the second quantization endpoint, the encoder device may fix the first quantization endpoint to the selected first candidate value for the first quantization endpoint, and then select one of a plurality of second candidate values for the second quantization endpoint based on a plurality of corresponding second quantization errors. For example, in certain embodiments, the encoder device may perform, for example, a divide-and-conquer algorithm to identify the most optimal quantization value for the first quantization endpoint (e.g., most optimal lowest quantization value for the quantization range) while the second quantization endpoint (e.g., most optimal highest quantization value for the quantization range) is fixed to a predetermined value. Specifically, in some embodiments, performing the divide-and-conquer algorithm, for example, may include first determining a minimum color value and a maximum color value for the color range of the red color component, the green color component, or the blue color component. The encoder device may then fix the second quantization endpoint to the maximum color value of the particular color component range (e.g., separate color range for the red color component, separate color range for the green component, or separate color range for the blue component).

In certain embodiments, the encoder device may then enumerate all possible quantization values of the first quantization endpoint to identify the most optimal quantization value for the first quantization endpoint. The encoder device may then calculate the quantization error for each of the identified possible quantization values for the first quantization endpoint, and then select the quantization value with the least amount of quantization error. For example, in one embodiment, the quantization value of the first quantization endpoint may be determined and selected based on an M number of trials of differing quantization values for the first quantization endpoint while the second quantization endpoint remains fixed to the maximum color value. In one embodiment, the M number of trials of differing quantization values for the first quantization endpoint may be spaced by a calculated quantization step size.

In some embodiments, upon determining and selecting the most optimal quantization value of the first quantization endpoint, the encoder device may then proceed in determining and selecting the most optimal quantization value of the second quantization endpoint by enumerating all possible quantization values for the second quantization endpoint while the first quantization endpoint remains fixed at the determined and selected the most optimal quantization value of the first quantization endpoint. In one embodiment, the second quantization endpoint may be determined and selected based on N−1 number of trials of differing quantization values for the second quantization endpoint.

In other embodiments, to determine the first quantization endpoint and the second quantization endpoint, the encoder device may perform, for example, an exhaustive search algorithm (e.g., brute force) in which all possible combinations for the first quantization endpoint and the second quantization endpoint are enumerated to identify the most optimal quantization values for the first quantization endpoint and the second quantization endpoint. Specifically, if there are M possible selections for the first quantization endpoint and N possible selections for the second quantization endpoint, the encoder device may select the most optimal quantization value of each of the first quantization endpoint and the second quantization endpoint by calculating the quantization error for all M*N combinations, and then selecting the particular M*N combination with the least amount of quantization error.

In certain embodiments, following the selection and determination of the most optimal quantization values for the first quantization endpoint (e.g., most optimal lowest quantization value for the quantization range) and the second quantization endpoint (e.g., most optimal highest quantization value for the quantization range), the encoder device may define quantization levels corresponding to the bit depth using the quantization range defined by the first quantization endpoint and the second quantization endpoint. For example, in one embodiment, the intervening quantization levels may then be selected as equally spaced quantization values (e.g., equally spaced based on a calculated quantization step size) between the first quantization endpoint and the second quantization endpoint, forming the range of quantization levels corresponding to the bit depth for the one or more color components. The encoder device may then encode the one or more color components of the pixel region using the determined quantization levels.

The present embodiments further include techniques for selectively performing a compression rate control method of allocating available bits to different alpha components that may be utilized to reduce memory consumption and decrease network bandwidth and reduce data transmission latency. In certain embodiments, the encoder device may access first alpha values associated with first pixels in a first pixel region of an N-bit color image (e.g., 8-bit color image). The encoder device may then determine a bit budget for encoding the first alpha values. For example, in some embodiments, a fixed-point representation may be used to determine a bit budget for each alpha channel component per pixel block. For example, because the encoder device may not utilize many bits to, for example, mask out foreground and background pixels, only quantization values up to 4 bits may be utilized. Thus, in some embodiments, the encoder device may determine, for example, a fixed-point an alpha allocation budget of 2.67 bpp.

In certain embodiments, the encoder device may then select a first alpha-encoding mode for the first alpha values to reflect a determination that the first alpha values are all fully transparent or all fully opaque. For example, in some embodiments, for alpha-encoding modes corresponding to a predetermined "Transparent mode" or an "Opaque mode", all of the alpha components in the pixel block may be determined by the encoder device to be "0" alpha value when in the "Transparent mode") and "255" alpha value when in "Opaque mode"). The encoder device may then encode the first alpha values by storing the selected first alpha-encoding mode as part of metadata associated with the first pixel region without using the bit budget to encode the first alpha values individually. For example, when the encoder device determines that the first alpha values are all fully transparent or all fully opaque, the encoder device may not encode the alpha components, and may instead store as metadata one or more 2-bit alpha-encoding mode signifiers indicating that the first alpha values are all fully transparent or all fully opaque.

In certain embodiments, the encoder device may then update a record of unallocated bits available for allocation based on the bit budget unused in the encoding of the first alpha values. For example, the encoder device may increment the record of unallocated bits alpha allocation budget of 2.67 bits (e.g., bits unused from the determined alpha allocation budget of 2.67 bpp). The encoder device may then allocate, based on the record of unallocated bits, one or more bits to encode a set of alpha values different from the first alpha values. For example, the bits unused (e.g., 2.67 bits) from the determined alpha allocation budget of 2.67 bpp may be recorded and allocated for encoding the alpha values of one or more other color components, for example.

FIG. 1A illustrates an example artificial reality system 100A. In particular embodiments, the artificial reality system 100A may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2:
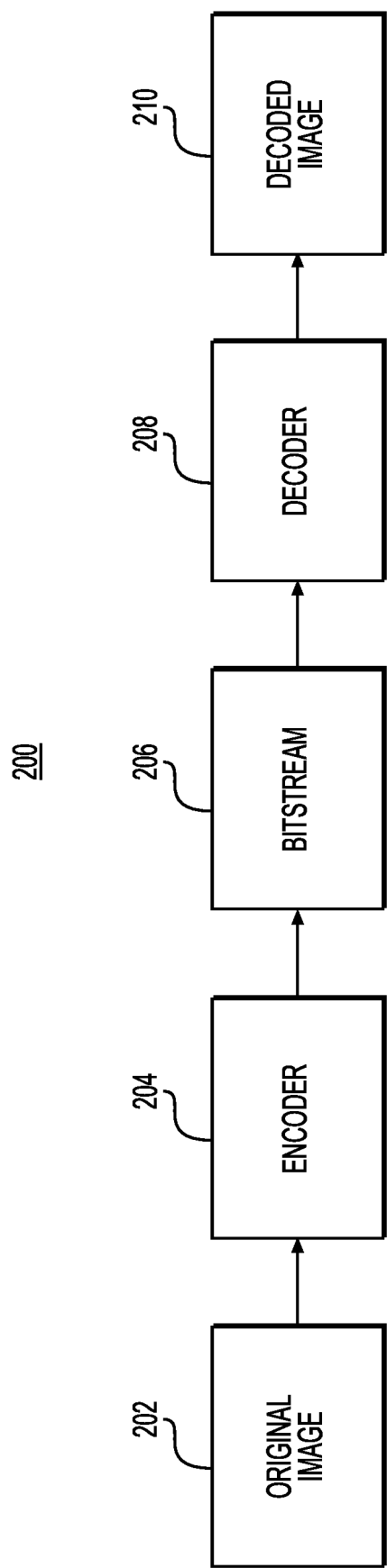
FIG. 2 illustrates an example encoder-decoder (codec) system.

FIG. 2 illustrates an encoder-decoder (codec) system 200 that may be useful in performing forgoing techniques as discussed herein, in accordance with the presently disclosed embodiments. In some embodiments, the codec system 200 may be implemented as part of a subsystem on one or more general purpose processors, or may include a standalone graphic processing units (GPU), an application-specific integrated circuit (ASIC), a system-on-chip (SoC), a microcontroller, a field-programmable gate array (FPGA), or any other processing device(s) that may be suitable for processing image data. As depicted in FIG. 2, in some embodiments, the data flow of the codec system 200 may include receiving an original image 202 to be encoded via an encoder device 204, stored into a bitstream 206, and decoded via a decoder device 208 to generate a compressed and decoded image 210 to be stored and/or transmitted.

In one embodiment, the original image 202 may include one or more 8-bit color images (e.g., still image frames, video image frames) including, for example. In other embodiments, the original image 202 may include a 2-bit color image, a 4-bit color image, a 6-bit color image, a 10-bit color image, a 12-bit color image, a 16-bit color image, a 24-bit color image, or any suitable N-bit color image that may be received and processed by the codec system 200. In certain embodiments, the encoder device 204 may include any device that may be utilized, for example, to receive the original image 202 and convert the original image 202 into a bitstream 206 (e.g., binary pixel data). Similarly, the decoder device 208 may include any device that may be utilized, for example, to receive the encoded bitstream 206 of binary pixel data and decode the bitstream 206 (e.g., binary pixel data) to generate the compressed and decoded image 210.

Indeed, as will be further appreciated with respect to FIGS. 3, 4, 5A-5C, and 6-8, the codec system 200, and particularly the encoder device 204, may be utilized for (1) providing a compression rate control separate allocation of available bits to different RGB color components; (2) efficiently and optimally selecting quantization levels that provide the least amount of quantization error and improve visual quality; and (3) selectively and independently for selectively performing a compression rate control method of allocating available bits to different alpha components that may be utilized to reduce memory consumption and decrease network bandwidth and reduce data transmission latency, among various other techniques in accordance with the presently disclosed embodiments.

Rate Controlled Individual Color Channel Image Compression

Figure 3:
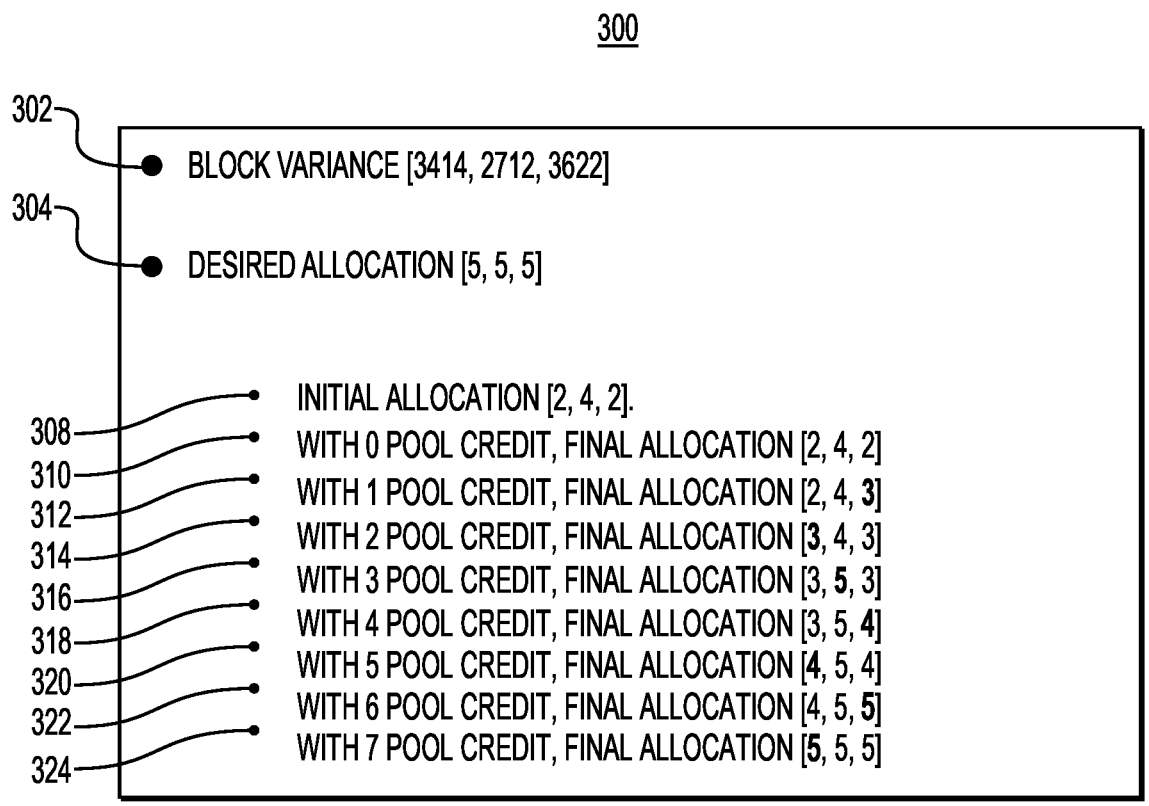
FIG. 3 illustrates a diagram of a running example of a compression rate control method of allocating available bits to different RGB color components.

Turning now to FIG. 3, a running example 300 of the present techniques for (1) encoding individual color components separately and (2) providing a compression rate control method of allocating available bits to different RGB color components based on the amount of color information included in each of the 3 RGB color components of each pixel per pixel block, in accordance with the presently disclosed embodiments. However, it should be appreciated that the running example 300 depicted in FIG. 3 may be provided merely for the purposes of illustration of the present embodiments. Indeed, the present techniques may be applied in the compression of any N-bit image. In some embodiments, the running example 300 may correspond, for example, to a pixel region in an 8-bit color image, which may include RGB color components.

In certain embodiments, the encoder device 204 may calculate a total block color variance 302 for each of the color components of the pixel region (e.g., R color components total variance is "3414"; G color components total variance is "2712"; B color components total variance is "3622"). In certain embodiments, the encoder device 204 may then determine a desired bit allocation 304 for each of the color components (e.g., R color components bit allocation is "5"; G color components bit allocation is "5"; B color components bit allocation is "5") based on, for example, the particular color variance associated with that color component. While the present example may be discussed with respect to the desired bit allocation 304 (e.g., [5, 5, 5]), in some embodiments, the desired bit allocation 304 may include a bit allocation of [2, 4, 2] for the RGB color components. For example, in one embodiment, the bit allocation of [2, 4, 2] may achieve the least quantization error with respect to, for example, the G color components.

Specifically, the running example 300 shows an example in in which the desired allocation 304 is [5, 5, 5] with an initial allocation 308 of [2, 4, 2]. In certain embodiments, since each pixel block includes 8 bpp budget, if there are no extra bits available in a bit pool from previous pixel blocks, then 8 bpp and [2, 4, 2] is the resulting allocation 310. In certain embodiments, to be able to achieve the desired allocation [5, 5, 5], an additional 7 bits in the bit pool may be utilized that were accumulated, for example, from one or more previous pixel blocks that did not utilize their 8 bpp budget. Thus, the running example 300 shows that depending on the number of extra bits available in the bit pool at the time of encoding, a particular pixel block may arrive at a different final allocation. In certain embodiments, in the list of possible final allocations 312, 314, 316, 318, 320, 322, and 324, the 8 bpp budget may be always completely utilized along with all of the available bits in the bits pool.

For example, for the final allocation 312, the 8 bpp budget is completely utilized, and since there is 1 extra bit available in the bit pool, then the final allocation 312 is [2, 4, 3]. For the final allocation 314, the 8 bpp budget is completely utilized, and since there are 2 extra bits available in the bit pool, then the final allocation 314 is [3, 4, 3]. For the final allocation 316, the 8 bpp budget is completely utilized, and since there are 3 extra bits available in the bit pool, then the final allocation 316 is [3, 5, 3]. For the final allocation 318, the 8 bpp budget is completely utilized, and since there are 4 extra bits available in the bit pool, then the final allocation 318 is [3, 5, 4]. For the final allocation 320, the 8 bpp budget is completely utilized, and since there are 5 extra bits available in the bit pool, then the final allocation 320 is [4, 5, 4]. For the final allocation 322, the 8 bpp budget is completely utilized, and since there are 6 extra bits available in the bit pool, then the final allocation 322 is [4, 5, 5]. Lastly, for the final allocation 324, the 8 bpp budget is completely utilized, and since there are 7 extra bits available in the bit pool, then the final allocation 322 is [5, 5, 5]. Indeed, although not illustrated, in accordance with the presently disclosed techniques, in scenarios in which the bit pool includes more than 7 extra bits available in the bit pool, the extra available bits may remain in the bit pool and be utilized, for example, for one or more next pixel blocks. Further, it should be appreciated that the running example 300 may represent only one embodiment of the presently disclosed techniques. In other embodiments, any of various initial bit allocations (e.g., [a, b, c]) that may be selected based on, for example, empirical decisions or knowledge (e.g., the fact that human eyes are more sensitive to (G) green color) that may be factored into the design by utilizing various initial bit allocations.

Figure 4:
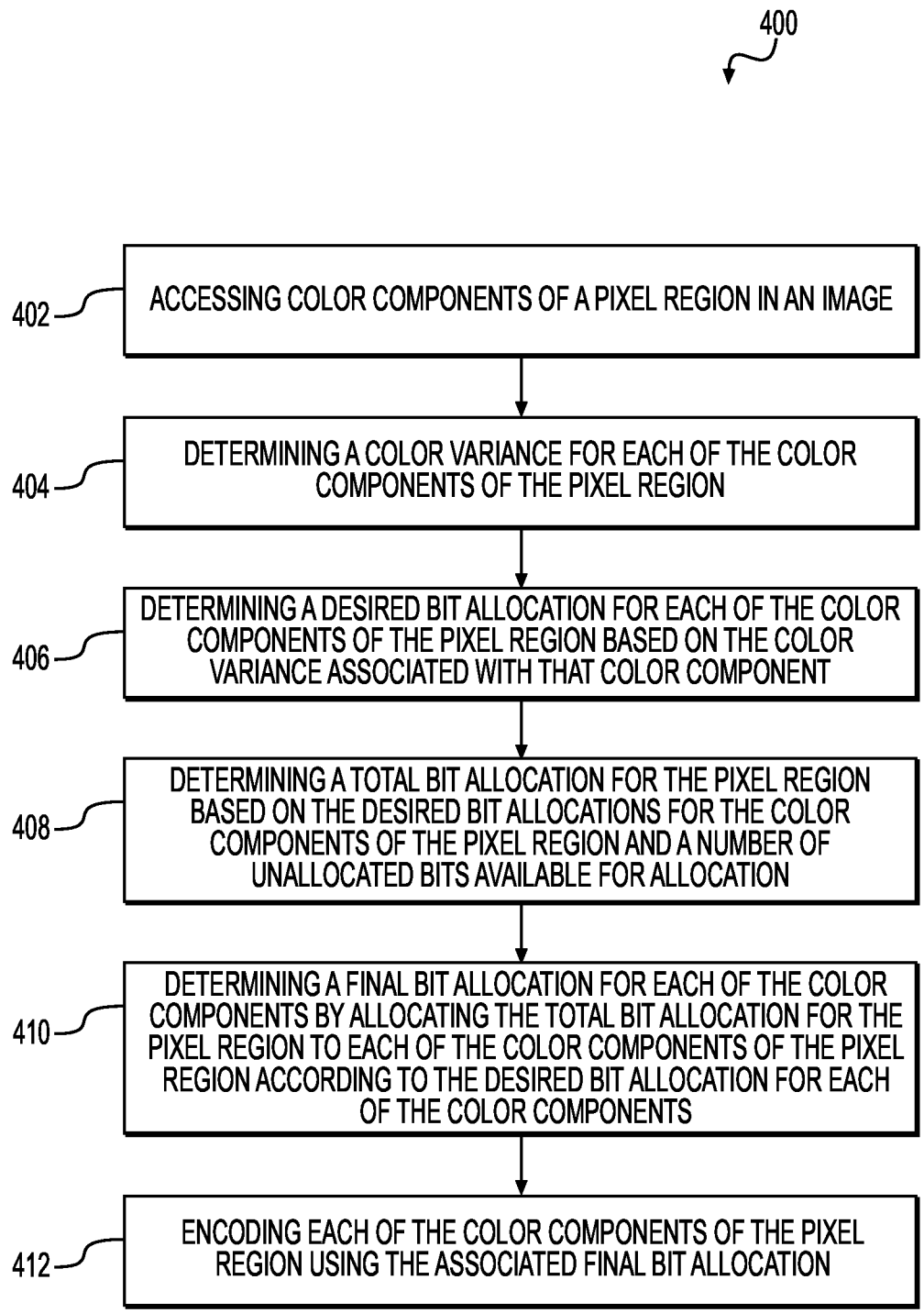
FIG. 4 is a flow diagram of a method for providing a compression rate control method of allocating available bits to different RGB color components.

FIG. 4 illustrates is a flow diagram of a method 400 for (1) encoding individual color components separately and (2) providing a compression rate control method of allocating available bits to different RGB color components based on the amount of color information included in each of the 3

RGB color components of each pixel per pixel block, in accordance with the presently disclosed embodiments. The method 400 may be performed utilizing one or more processors (e.g., encoder device 204) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or any combination thereof.

The method 400 may begin at block 402 with one or more processors (e.g., encoder device 204) accessing color components of a pixel region in an image. For example, in one embodiment, the image may include an N-bit color image (e.g., 8-bit color image), which may include red (R) color components, green (G) color components, and blue (B) color components to be compressed and stored and/or transmitted, for example. The method 400 may continue at block 404 with the one or more processors (e.g., encoder device 204) determining a color variance for each of the color components of the pixel region. For example, in certain embodiments, the encoder device 204 may perform a pre-analysis of the of the N-bit color image (e.g., on a pixel region by pixel region basis) and determine a mean (e.g., an average of the total pixel value) and a variance (e.g., a measure of the average degree to which each RGB color component is different from the mean value) with respect to each of the RGB color components of each pixel per pixel region.

The method 400 may then continue at block 406 with the one or more processors (e.g., encoder device 204) determining a desired bit allocation for each of the color components of the pixel region based on the color variance associated with that color component. For example, in some embodiments, the encoder device 204 may determine a desired bit allocation [x, y, z] (e.g., x—corresponding to the all of the red color components of the pixel region; y—corresponding to the all of the green color components of the pixel region; and z—corresponding to the all of the blue color components of the pixel region) for encoding each of the RGB color components of the pixel region based on the color variance associated with each of the RGB color components. The method 400 may then continue at block 408 with the one or more processors (e.g., encoder device 204) determining a total bit allocation budget for the pixel region based on the desired bit allocation for the color components of the pixel region and a number of unallocated bits available for allocation.

For example, in some embodiments, the encoder device 204 may determine the total bit allocation budget (e.g., N=bit allocation budget+number of unallocated bits available for allocation) and the number of unallocated bits available for allocation (e.g., N bits). The method 400 may then continue at block 410 with the one or more processors (e.g., encoder device 204) determining a final bit allocation for each of the color components by allocating the total bit allocation for the pixel region to each of the color components of the pixel region according to the desired bit allocation for each of the color components. For example, in certain embodiments, the encoder device 204 may determine the final bit allocation by comparing, for example, the number of unallocated bits available for allocation (e.g., N bits) to the desired bit allocation [x, y, z].

Specifically, in some embodiments, the number of unallocated bits available for allocation may correspond to a predetermined bit allocation budget (e.g., N bpp) for the pixel region. Thus, in response to determining that a sum of the desired bit allocations (e.g., x, y, z) for each of the RGB color components is less than or equal to the bit allocation budget (e.g., N bpp) for the pixel region, the method 400 may then conclude at block 412 with the one or more processors (e.g., encoder device 204) encoding each of the color components of the pixel region using the final bit allocation. For example, when the sum of the desired bit allocations (e.g., x, y, z) for each of the RGB color components is less than or equal to the bit allocation budget (e.g., N bpp), the final bit allocation may correspond to the desired bit allocation [x, y, z]. Accordingly, the bit allocation budget of N bits may be distributed to each of the RGB color components for the pixel region to correspond to the desired bit allocation [x, y, z].

Optimal Selection of Quantization Levels in Image Compression

Figure 5:
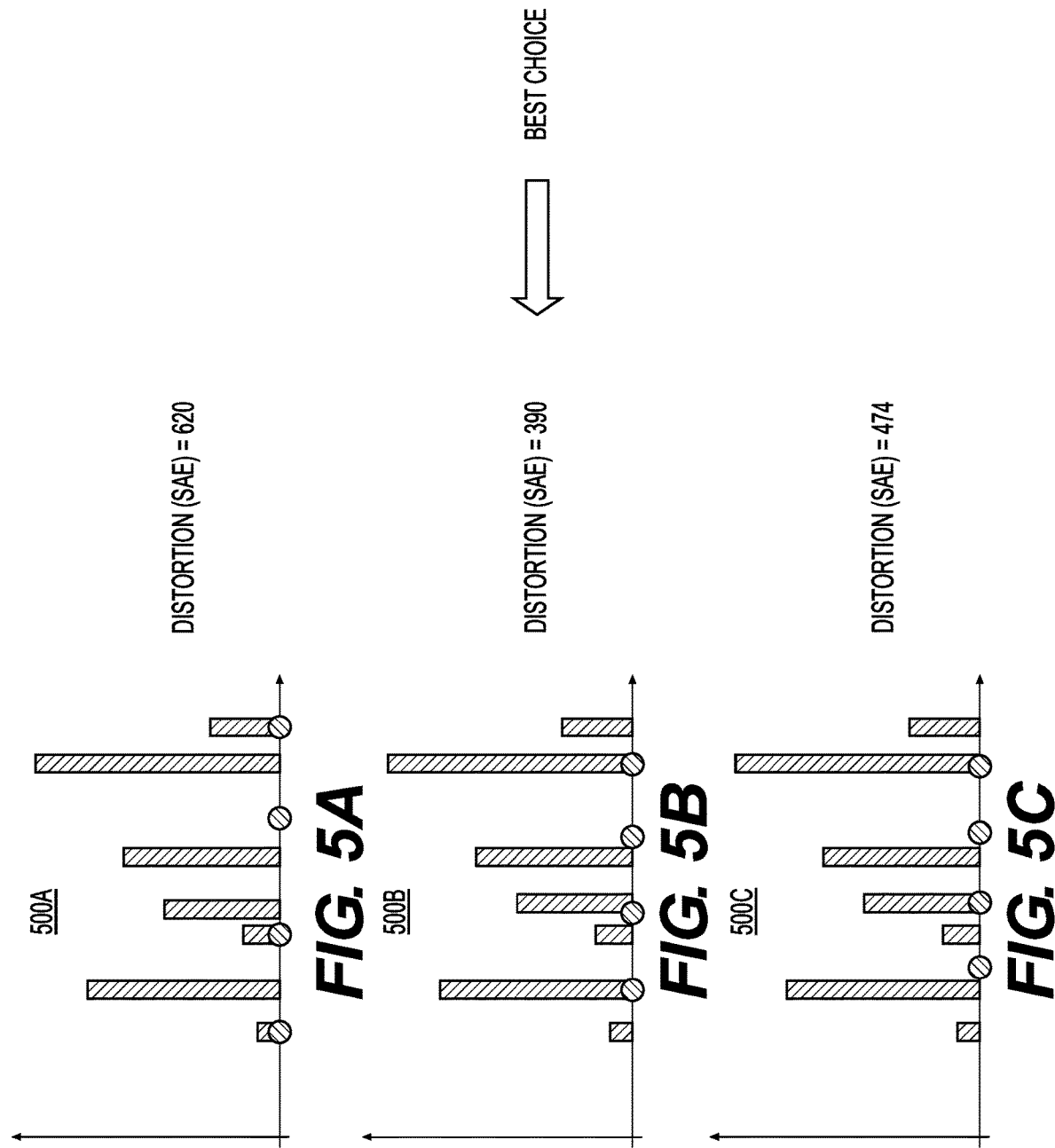
FIGS. 5A, 5B, and 5C illustrate respective example RGB histograms for efficiently and optimally selecting quantization levels that provide the least amount of quantization error.

FIGS. 5A, 5B, and 5C illustrate respective RGB histograms 500A, 500B, and 500C, which may illustrate techniques for efficiently and optimally selecting quantization levels that provide the least amount of quantization error and improve visual quality, in accordance with the presently disclosed embodiments. Specifically, as illustrated by the respective RGB histograms 500A, 500B, and 500C, the vertical bars may represent, for example, one or more pixel histograms while the circles, for example, may represent individual quantization levels. Indeed, as depicted, maintaining the same one or more pixel histograms across the respective RGB histograms 500A, 500B, and 500C, differing selections of the quantization levels result in differing amounts of quantization error (e.g., as measured using sum of squared errors (SAE)).

For example, referring again to the respective RGB histograms 500A, 500B, and 500C, to minimize quantization error and to improve visual quality, a first endpoint quantization level and a second endpoint quantization level may be carefully selected, as they directly influence quantization errors. In certain embodiments, as discussed in further detail below with respect to FIG. 6, a number of first candidate pixel values for the first endpoint quantization level (e.g., the leftmost circle or minimum quantization level along an axis that represents color values) and a number of second candidate pixel values for the second endpoint quantization level (e.g., the rightmost circle or maximum quantization level along the axis) may be determined.

Based on a comparison of the resulting quantization errors, a particular first candidate pixel value for the first endpoint quantization level may be selected and a particular second candidate pixel value for the second endpoint quantization level may be selected. For example, referring again to the respective RGB histograms 500A (e.g., 620 SAE), 500B (e.g., 390 SAE), and 500C (e.g., 474 SAE), the RGB histogram 500B (e.g., 390 SAE) may be selected as the most optimal because the selection of the RGB histogram 500B (e.g., 390 SAE) leads to the lowest quantization error as compared to the RGB histogram 500A (e.g., 620 SAE) and the RGB histogram 500C (e.g., 474 SAE). The intervening quantization levels may then be systematically determined based on the selection of the first endpoint quantization level and the second endpoint quantization level and a calculated quantization step size.

Figure 6:
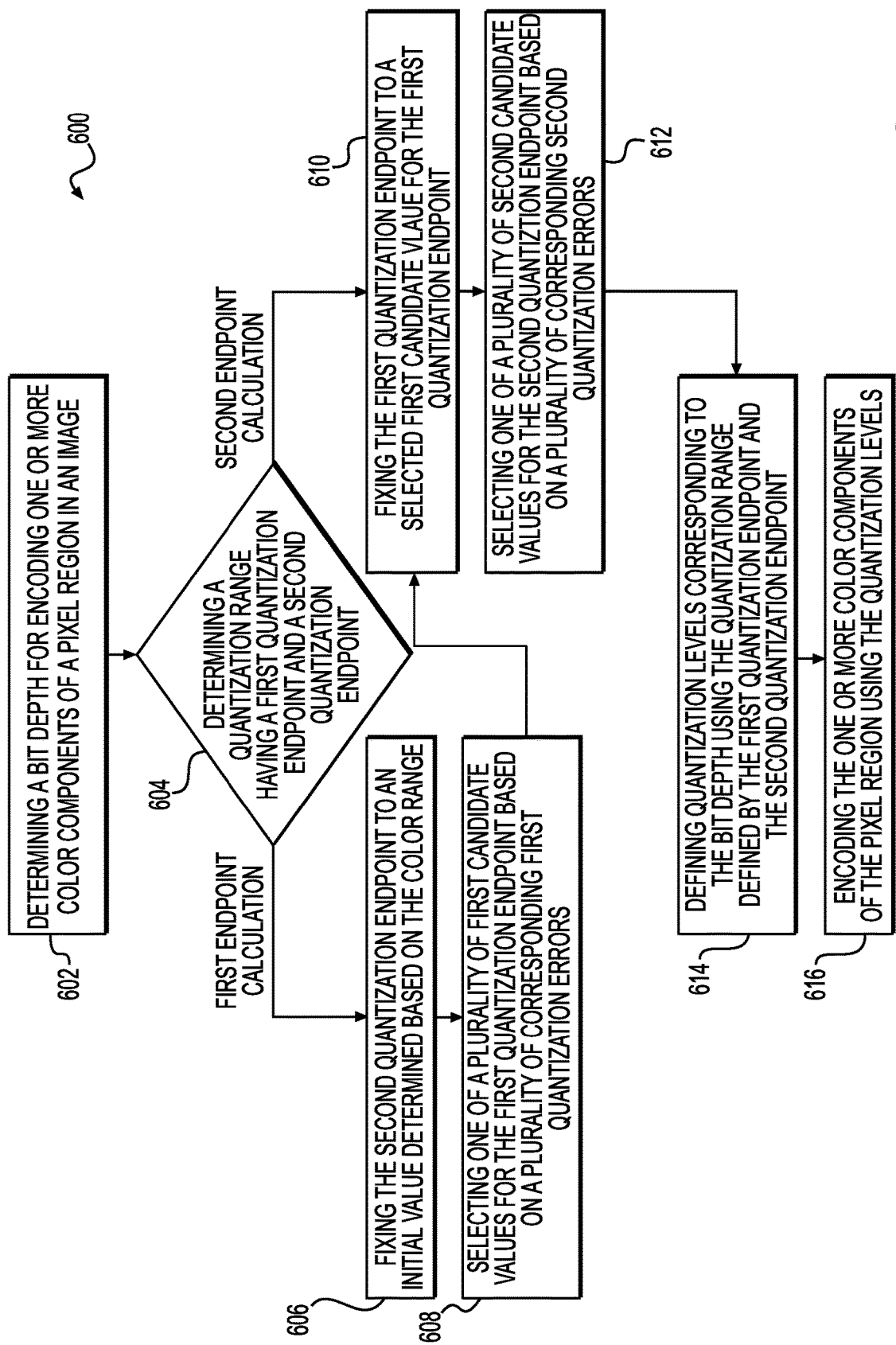
FIG. 6 is a flow diagram of a method for efficiently and optimally selecting quantization levels that provide the least amount of quantization error.

FIG. 6 illustrates a flow diagram of a method 600 for efficiently and optimally selecting quantization levels that provide the least amount of quantization error and improve visual quality in the compression of images, in accordance with the presently disclosed embodiments. The method 600 may be performed utilizing one or more processors (e.g., encoder device 204) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or any combination thereof.

The method 600 may begin at block 602 with one or more processors (e.g., encoder device 204) determining a bit depth for encoding one or more color components of a pixel region in an image, in which the one or more color components includes a color range. For example, in one embodiment, the image may include an N-bit color image, which may include red (R) color components, green (G) color components, and blue (B) color components to be separately and independently encoded and compressed. The method 600 may continue at block 604 with the one or more processors (e.g., encoder device 204) determining a quantization range having a first quantization endpoint and a second quantization endpoint.

Specifically, for calculation of the first quantization endpoint, the method 600 may continue at block 606 with the one or more processors (e.g., encoder device 204) fixing the second quantization endpoint to an initial value determined based on the color range, at then at block 608 with the one or more processors (e.g., encoder device 204) selecting one of a plurality of first candidate values for the first quantization endpoint based on a plurality of corresponding first quantization errors. Similarly, for calculation of the second quantization endpoint, the method 600 may continue at block 610 with the one or more processors (e.g., encoder device 204) fixing the first quantization endpoint to the selected first candidate value for the first quantization endpoint, and then at block 612 with the one or more processors (e.g., encoder device 204) selecting one of a plurality of second candidate values for the second quantization endpoint based on a plurality of corresponding second quantization errors.

For example, in certain embodiments, the encoder device 204 may perform, for example, a divide-and-conquer algorithm to identify the most optimal quantization value for the first quantization endpoint (e.g., most optimal lowest pixel value for the quantization range) while the second quantization endpoint (e.g., most optimal highest pixel value for the quantization range) is fixed to a predetermined value. Specifically, in some embodiments, performing the divide-and-conquer algorithm, for example, may include first determining a minimum color value and a maximum color value for the color range of the red color component, the green color component, or the blue color component. The encoder device 204 may then fix the second quantization endpoint to the maximum color value of the particular color component range (e.g., separate color range for the (R)ed color component, separate color range for the (G)reen component, or separate color range for the (B)lue component).

In certain embodiments, the encoder device 204 may then enumerate all possible pixel values of the first quantization endpoint to identify the most optimal pixel value for the first quantization endpoint. The encoder device 204 may then calculate the quantization error for each of the identified possible pixel values for the first quantization endpoint, and then selecting the pixel value with the least amount of quantization error. For example, in one embodiment, the pixel value of the first quantization endpoint may be determined and selected based on an M number of trials of differing pixel values for the first quantization endpoint while the second quantization endpoint remains fixed to the maximum color value. In one embodiment, the M number of trials of differing pixel values for the first quantization endpoint may be spaced by a calculated quantization step size.

In certain embodiments, upon determining and selecting the most optimal quantization value of the first quantization endpoint, the encoder device 204 may then proceed in determining and selecting the most optimal quantization value of the second quantization endpoint by enumerating all possible pixel values for the second quantization endpoint while the first quantization endpoint remains fixed at the determined and selected the most optimal pixel value of the first quantization endpoint. In one embodiment, the second quantization endpoint may be determined and selected based on N−1 number of trials of differing pixel values for the second quantization endpoint.

In other embodiments, to determine the first quantization endpoint and the second quantization endpoint, the encoder device 204 may perform, for example, an exhaustive search algorithm (e.g., brute force) in which all possible combinations for the first quantization endpoint and the second quantization endpoint are enumerated to identify the most optimal pixel value for the first quantization endpoint and the second quantization endpoint. Specifically, if there are M possible selections for the first quantization endpoint and N possible selections for the second quantization endpoint, the encoder device 204 may select the most optimal pixel value of each of the first quantization endpoint and the second quantization endpoint may include calculating the quantization error for all M*N combinations, and then selecting the particular M*N combination with the least amount of quantization error.

In certain embodiments, following the selection and determination of the most optimal quantization value for the first quantization endpoint (e.g., most optimal lowest pixel value for the quantization range) and the second quantization endpoint (e.g., most optimal highest quantization value for the quantization range), the method 600 may then continue at block 614 with the one or more processors (e.g., encoder device 204) defining quantization levels corresponding to the bit depth using the quantization range defined by the first quantization endpoint and the second quantization endpoint. For example, in one embodiment, the intervening quantization levels may then be selected as equally spaced quantization values (e.g., equally spaced based on a calculated quantization step size) between the first quantization endpoint and the second quantization endpoint, forming the range of quantization levels corresponding to the bit depth for the one or more color components. The method 600 may then conclude at block 616 with the one or more processors (e.g., encoder device 204) encoding the one or more color components of the pixel region using the quantization levels.

Efficient Compression of Alpha Channel in Image Compression

FIG. 7 depicts a table diagram 700 that may illustrate one or more predetermined alpha-encoding modes 702, 704, 706, and 708 for selectively performing a compression rate control method of allocating available bits to different alpha components, in accordance with the presently disclosed embodiments. Specifically, as the majority of alpha channel pixel blocks may include either alpha pixels in which the pixels are either completely transparent or completely opaque, or include full range of transparency levels (e.g., 0-255 for an 8-bit alpha pixel block), it may be useful to determine the mode of an alpha component pixel block before any encoding. For example, in some embodiments, the encoder device 204 may generate a signal indicating the particular mode of a pixel block. In one embodiment, the signal may include a 2-bit value that indicates one of the four alpha-encoding modes 702 (e.g., "00"="Transparent mode"), 704 (e.g., "01"="Opaque mode"), 706 (e.g., "10"="Full Range mode"), and 708 (e.g., "11"=Alpha mode").

Figure 8:
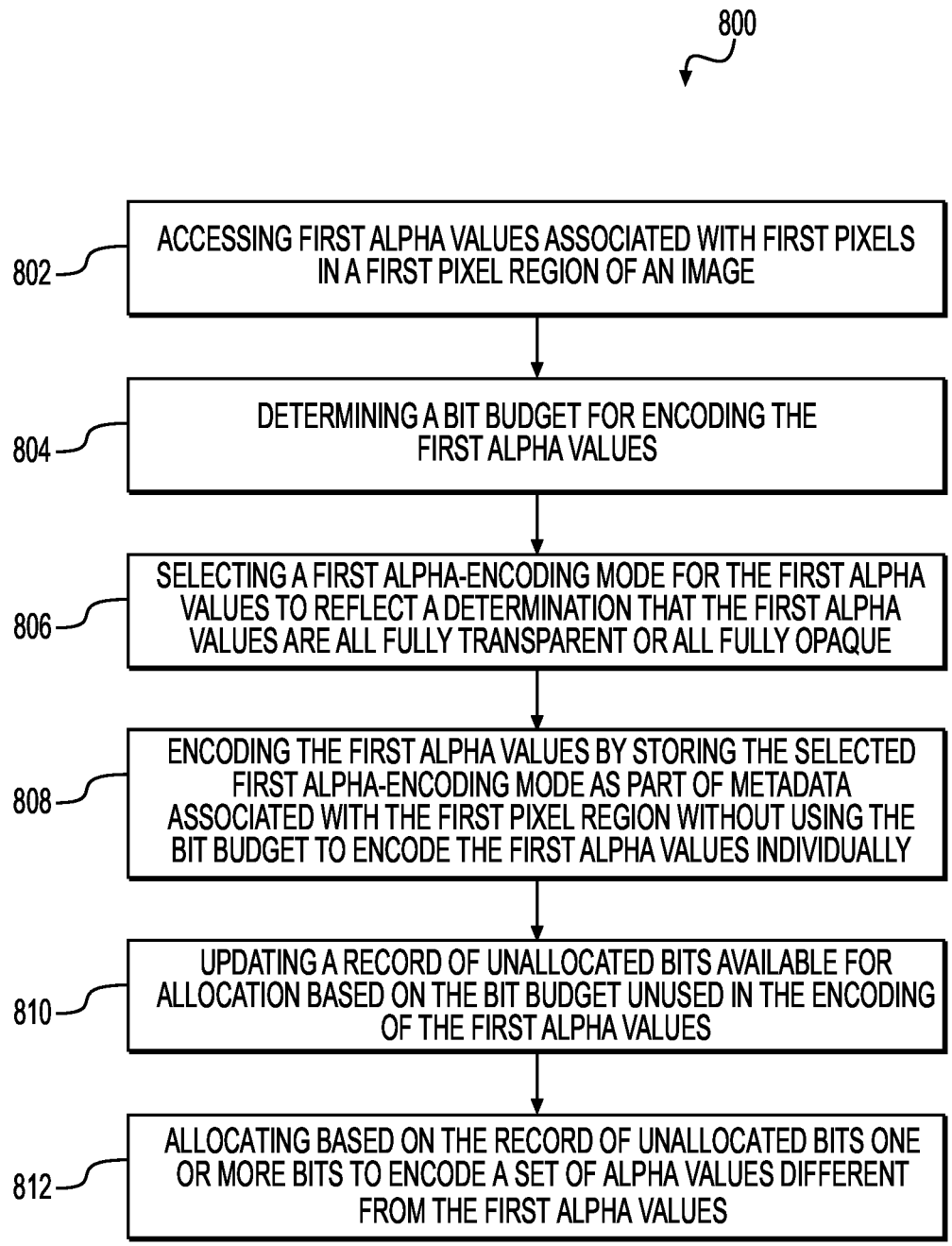
FIG. 8 is a flow diagram of a method for selectively performing a compression rate control method of allocating available bits to different alpha components.

FIG. 8 illustrates a flow diagram of a method 800 for selectively performing a compression rate control method of allocating available bits to different alpha components, in accordance with the presently disclosed embodiments. The method 800 may be performed utilizing one or more processors (e.g., encoder device 204) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or any combination thereof.

The method 800 may begin at block 802 with one or more processors (e.g., encoder device 204) accessing first alpha values associated with first pixels in a first pixel region of an image. For example, in one embodiment, the image may include an N-bit color image (e.g., 8-bit color image), which may include (R)ed color components, (G)reen color components, and (B)lue color components. A separate alpha component may be associated with each of the (R)ed color components, (G)reen color components, and (B)lue color components. That is, in one embodiment, the alpha values may be encoded on a per-color component (e.g., RGB) basis. In another embodiment, a single alpha component may be utilized for each RGB image. The method 800 may continue at block 804 with the one or more processors (e.g., encoder device 204) determining a bit budget for encoding the first alpha values. For example, in some embodiments, a fixed-point representation may be used to determine a bit budget for each alpha channel component per pixel block. For example, because the encoder device 204 may not utilized many bits to, for example, mask out foreground and background pixels, only quantization values up to 4 bits may be utilized. Thus, in some embodiments, the encoder device 204 may determine, for example, a fixed-point an alpha allocation budget of 2.67 bpp.

The method 800 may then continue at block 806 with the one or more processors (e.g., encoder device 204) selecting a first alpha-encoding mode for the first alpha values to reflect a determination that the first alpha values are all fully transparent or all fully opaque. For example, in some embodiments, for the alpha-encoding mode 702 (e.g., "00"="Transparent mode") or the alpha-encoding mode 704 (e.g., "01"="Opaque mode"), all of the alpha components in the pixel block may be determined by the encoder device 204 to be "0" alpha value when in the mode 702 (e.g., "00"="Transparent mode") and "255" alpha value when in the alpha-encoding mode 704 (e.g., "01"="Opaque mode"). The method 800 may then continue at block 808 with the one or more processors (e.g., encoder device 204) encoding the first alpha values by storing the selected first alpha-encoding mode as part of metadata associated with the first pixel region without using the bit budget to encode the first alpha values individually. For example, when the encoder device 204 determines that the first alpha values are all fully transparent or all fully opaque, the encoder device 204 may not encode the alpha components, and may instead simply store as metadata the 2-bit alpha-encoding mode signifiers (e.g., "00"; "01") indicating that the first alpha values are all fully transparent or all fully opaque.

The method 800 may then continue at block 810 with the one or more processors (e.g., encoder device 204) updating a record of unallocated bits available for allocation based on the bit budget unused in the encoding of the first alpha values. For example, the encoder device 204 may increment the record of unallocated bits alpha allocation budget of 2.67 bits (e.g., bits unused from the determined alpha allocation budget of 2.67 bpp). The method 800 may then conclude at block 812 with the one or more processors (e.g., encoder device 204) allocating, based on the record of unallocated bits one or more bits to encode a set of alpha values different from the first alpha values. For example, the bits unused (e.g., 2.67 bits) from the determined alpha allocation budget of 2.67 bpp may be recorded and allocated for encoding the alpha or RGB values of other pixel regions and/or pixel blocks In certain embodiments, the encoder device 204 may also access second alpha values associated with pixels in a second pixel region of the image. For example, the second alpha values may correspond to alpha values of one or more other color components. The encoder device 204 may then determine the bit budget for encoding the second alpha values. For example, the encoder device 204 may determine, for example, the fixed-point an alpha allocation bit budget of 2.67 bpp. The encoder device 204 may then select a second alpha-encoding mode for the second alpha values to reflect a determination that the second alpha values have a uniform partial-transparency level between fully transparent and fully opaque the alpha-encoding mode. For example, in some embodiments, the encoder device 204 may select the alpha-encoding mode 708 (e.g., "11=Alpha mode") as corresponding to the uniform partial-transparency level.

In certain embodiments, the encoder device 204 may then encode the second alpha values by storing the selected second alpha-encoding mode (e.g., alpha-encoding mode 708 ("11"="Alpha mode")) and the uniform partial-transparency level as part of a metadata associated with the second pixel region without using the bit budget to encode the second alpha values individually. For example, in some embodiments, the encoder device 204 may encode the second alpha values by storing as part of a metadata associated with the second pixel region the selected second alpha-encoding mode (e.g., alpha-encoding mode 708 (e.g., "11=Alpha mode"), the uniform partial-transparency level (e.g., a first alpha quantization endpoint corresponding to the leftmost or minimum alpha quantization level along an axis that represents alpha values), and an encoding-precision value. Specifically, when the encoder device 204 determines that the second alpha values correspond to the uniform partial-transparency level, the encoder device 204 may not encode the alpha components. The encoder device 204 may instead store as metadata the 2-bit alpha-encoding mode signifier (e.g., "11") together with an encoding-precision value (e.g., "0") indicating, for example, that no bit is allocated for individually encoding each of the second alpha values. The encoder device 204 may then update the record of unallocated bits available for allocation based on the bit budget unused in the encoding of the second alpha values. For example, the bits unused (e.g., 2.67 bits) from the determined alpha allocation budget of 2.67 bpp may be recorded and allocated for encoding the alpha values of one or more other color components, for example. It should be appreciated that, in some embodiments, the metadata may contain the alpha pixel value that may be utilized, for example, by the decoder device 208 to populate a whole pixel block. In some embodiments, unused alpha bit budget may also be used for subsequent alpha blocks, for example.

In another embodiment, the encoder device 204 may select a second alpha-encoding mode for the second alpha values to reflect a determination that the second alpha values have at most two partial-transparency levels. For example, in some embodiments, the encoder device 204 may select the alpha-encoding mode 708 (e.g., "11"=Alpha mode") as corresponding to the two partial-transparency levels. The encoder device 204 may then encode the second alpha values by storing as part of a metadata associated with the second pixel region the selected second alpha-encoding mode (e.g., alpha-encoding mode 708 (e.g., "11"=Alpha mode")) the two partial-transparency levels (e.g., a first alpha quantization endpoint corresponding the leftmost or minimum alpha quantization level along an axis that represents alpha values and a second alpha quantization endpoint corresponding the rightmost or maximum alpha quantization level along the axis), and an encoding-precision value (e.g., "1"). The encoding-precision value (e.g., "1") may be stored by the encoder device 204 as an indication, for example, that one bit is allocated for individually encoding each of the second alpha values.

The encoder device 204 may then quantize each of the second alpha values to either of the two partial-transparency levels using a one-bit index. For example, the encoder device 204 may select the first alpha quantization endpoint as corresponding to a value of "0" (e.g., the leftmost or minimum alpha quantization level) and the second alpha quantization endpoint as corresponding to a value of "1" (the rightmost or maximum alpha quantization level). The encoder device 204 may then update the record of unallocated bits available for allocation based on an unused portion of the bit budget in the encoding of the second alpha values. For example, the bits unused (e.g., 1.67 bits) from the determined alpha allocation budget of 2.67 bpp may be recorded and allocated for encoding the alpha values of one or more other color components, for example. In some embodiments, unused alpha bit budget may also be used for subsequent alpha blocks, for example.

In other embodiments, two distinct alpha values may be utilized for a single pixel block. In such an embodiment, an alpha compression rate-controlled technique may be performed in which, for example, the appropriate number of bits may be allocated to the alpha block and each alpha value may be represented as a quantization index. For example, in some embodiments, the alpha compression rate-controlled technique as presently discussed may be performed similarly to the compression rate control technique of allocating available bits to different RGB color components as discussed above with respect to FIGS. 3 and 4, for example. However, with respect to the alpha compression rate-controlled techniques as presently discussed, the alpha compression rate-controlled techniques may include one or more bounds, such that when a minimum pixel value is less than, for example, a pixel value of 5 (e.g., approximately opaque) and maximum pixel value is greater than, for example, a pixel value of 250 (e.g., approximately transparent), 4 bits may be directly assign to the pixel block (e.g., assuming sufficient bits are available for the assignment). On the other hand, when sufficient bits are unavailable, the available bits may be distributed, for example, in a round robin sequence or other similar predetermined sequence selected to achieve optimal visual quality.

System Overview

Figure 9:
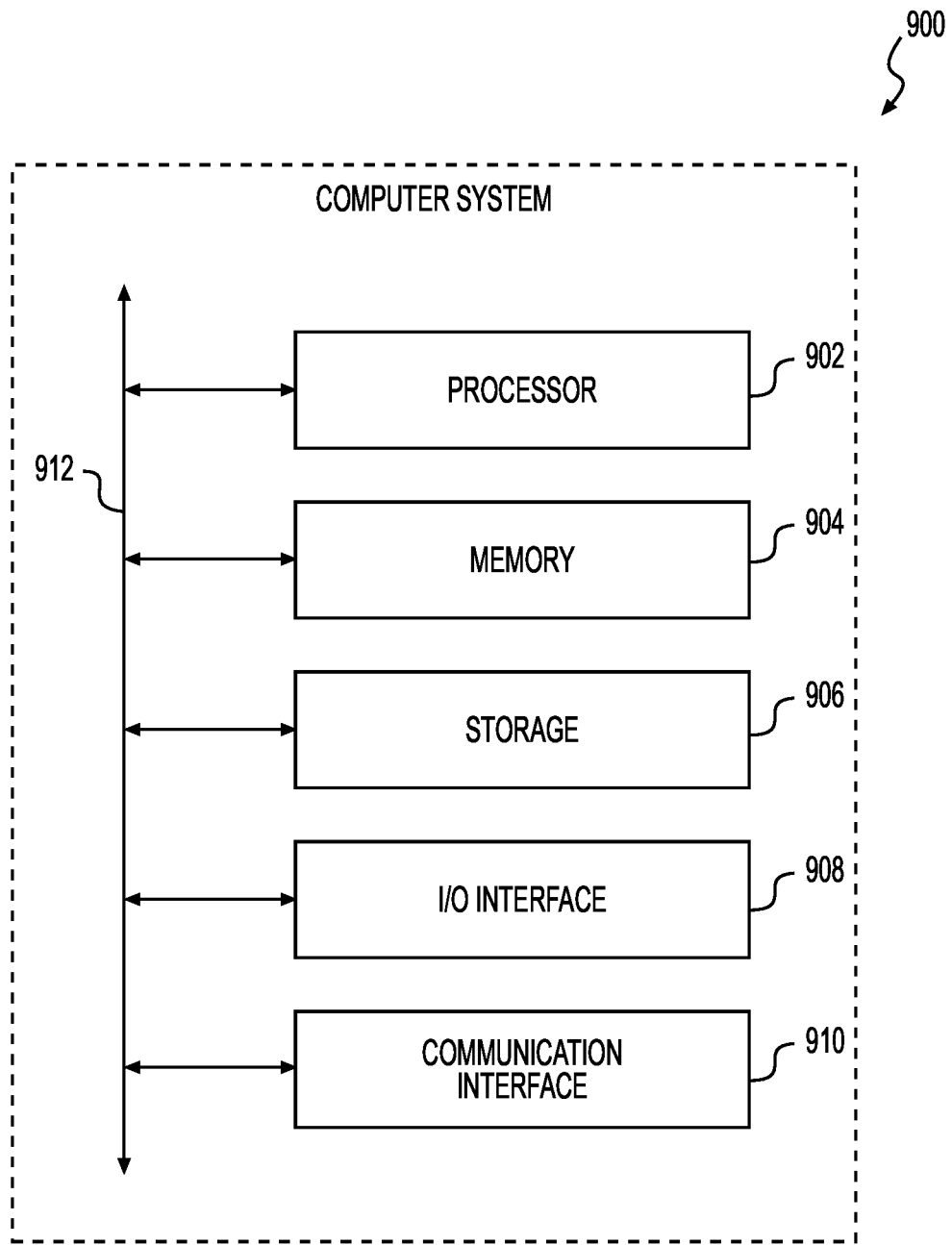
FIG. 9 illustrates an example computer system.

FIG. 9 illustrates an example computer system 900 that may be useful in performing one or more of the foregoing techniques as presently disclosed herein. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein.

As an example, and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate. In certain embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In certain embodiments, processor 902 includes hardware for executing instructions, such as those making up a computer program. As an example, and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example, and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902.

Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 602. Although this disclosure describes and illustrates a particular processor, this disclosure contemplates any suitable processor.

In certain embodiments, memory 904 includes main memory for storing instructions for processor 902 to execute or data for processor 902 to operate on. As an example, and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere).

One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example, and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In certain embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In certain embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In certain embodiments, communication interface 910 includes hardware, software, or both providing one or more interfaces for communication (such as, for example, packet-based communication) between computer system 900 and one or more other computer systems 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it.

As an example, and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In certain embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method implemented by a computing system, the method comprising:
    accessing first alpha values associated with first pixels in a first pixel region of an image;
    determining a bit budget for encoding the first alpha values;
    selecting a first alpha-encoding mode for the first alpha values to reflect a determination that the first alpha values are fully transparent or fully opaque;
    encoding the first alpha values by storing the selected first alpha-encoding mode as part of a metadata associated with the first pixel region without using the bit budget to encode the first alpha values;
    updating a record of unallocated bits available for allocation based on the bit budget unused in the encoding of the first alpha values; and
    allocating, based on the record of unallocated bits, one or more bits to encode a set of alpha values different from the first alpha values.

2. The method of claim 1, wherein the first pixels have three color components, and wherein the first alpha values are associated with one or more color components of the three color components.

3. The method of claim 2, wherein the set of alpha values are associated with one or more other color components of the three color components.

4. The method of claim 1, wherein the set of alpha values are associated with second pixels in a second pixel region of the image.

5. The method of claim 1, further comprising:
    accessing second alpha values associated with second pixels in a second pixel region of the image, wherein the bit budget is further determined for encoding the second alpha values; and
    selecting a second alpha-encoding mode for the second alpha values to reflect a determination that the second alpha values have a uniform partial-transparency level between fully transparent and fully opaque.

6. The method of claim 5, further comprising:
    encoding the second alpha values by storing at least the selected second alpha-encoding mode and the uniform partial-transparency level as part of a metadata associated with the second pixel region without using the bit budget to encode the second alpha values; and
    updating the record of unallocated bits available for allocation based on the bit budget unused in the encoding of the second alpha values.

7. The method of claim 1, further comprising:
    accessing second alpha values associated with second pixels in a second pixel region of the image, wherein the bit budget is further determined for encoding the second alpha values;

selecting a second alpha-encoding mode for the second alpha values to reflect a determination that the second alpha values have at most two partial-transparency levels; and encoding the second alpha values.

8. The method of claim 7, further comprising encoding the second alpha values by:

storing, as part of a metadata associated with the second pixel region, at least (1) the selected second alpha-encoding mode, (2) the two partial-transparency levels, and (3) an encoding-precision value indicating that one bit is allocated for encoding each of the second alpha values; and quantizing each of the second alpha values to either of the two partial-transparency levels using a one-bit index.

9. The method of claim 8, further comprising:

updating the record of unallocated bits available for allocation based on an unused portion of the bit budget in the encoding of the second alpha values.

10. A system, comprising:

one or more non-transitory computer-readable storage media including instructions; and one or more processors coupled to the storage media, the one or more processors configured to execute the instructions to:

access first alpha values associated with first pixels in a first pixel region of an image;

determine a bit budget for encoding the first alpha values;

select a first alpha-encoding mode for the first alpha values to reflect a determination that the first alpha values are fully transparent or fully opaque;

encode the first alpha values by storing the selected first alpha-encoding mode as part of a metadata associated with the first pixel region without using the bit budget to encode the first alpha values;

update a record of unallocated bits available for allocation based on the bit budget unused in the encoding of the first alpha values; and allocate, based on the record of unallocated bits, one or more bits to encode a set of alpha values different from the first alpha values.

11. The system of claim 10, wherein the first pixels have three color components, and wherein the first alpha values are associated with one or more color components of the three color components.

12. The system of claim 11, wherein the set of alpha values are associated with one or more other color components of the three color components.

13. The system of claim 10, wherein the instructions further comprise instructions to:

access second alpha values associated with second pixels in a second pixel region of the image, wherein the bit budget is further determined for encoding the second alpha values; and select a second alpha-encoding mode for the second alpha values to reflect a determination that the second alpha values have a uniform partial-transparency level between fully transparent and fully opaque.

14. The system of claim 13, wherein the instructions further comprise instructions to:

encode the second alpha values by storing at least the selected second alpha-encoding mode and the uniform partial-transparency level as part of a metadata associated with the second pixel region without using the bit budget to encode the second alpha values; and update the record of unallocated bits available for allocation based on the bit budget unused in the encoding of the second alpha values.

15. The system of claim 10, wherein the instructions further comprise instructions to:

access second alpha values associated with second pixels in a second pixel region of the image, wherein the bit budget is further determined for encoding the second alpha values;

select a second alpha-encoding mode for the second alpha values to reflect a determination that the second alpha values have at most two partial-transparency levels; and encode the second alpha values.

16. The system of claim 15, wherein the instructions further comprise instructions to encode the second alpha values by:

storing, as part of a metadata associated with the second pixel region, at least (1) the selected second alpha-encoding mode, (2) the two partial-transparency levels, and (3) an encoding-precision value indicating that one bit is allocated for encoding each of the second alpha values; and quantizing each of the second alpha values to either of the two partial-transparency levels using a one-bit index.

17. The system of claim 16, wherein the instructions further comprise instructions to:

update the record of unallocated bits available for allocation based on an unused portion of the bit budget in the encoding of the second alpha values.

18. A non-transitory computer-readable medium, comprising:

instructions that, when executed by one or more processors of a computing system, cause the one or more processors to:

access first alpha values associated with first pixels in a first pixel region of an image;

determine a bit budget for encoding the first alpha values;

select a first alpha-encoding mode for the first alpha values to reflect a determination that the first alpha values are fully transparent or fully opaque;

encode the first alpha values by storing the selected first alpha-encoding mode as part of a metadata associated with the first pixel region without using the bit budget to encode the first alpha values;

update a record of unallocated bits available for allocation based on the bit budget unused in the encoding of the first alpha values; and allocate, based on the record of unallocated bits, one or more bits to encode a set of alpha values different from the first alpha values.

19. The non-transitory computer-readable medium of claim 18, wherein the instructions further comprise instructions to:

access second alpha values associated with second pixels in a second pixel region of the image, wherein the bit budget is further determined for encoding the second alpha values; and select a second alpha-encoding mode for the second alpha values to reflect a determination that the second alpha values have a uniform partial-transparency level between fully transparent and fully opaque.

20. The non-transitory computer-readable medium of claim 18, wherein the instructions further comprise instructions to:

access second alpha values associated with second pixels in a second pixel region of the image, wherein the bit budget is further determined for encoding the second alpha values;

select a second alpha-encoding mode for the second alpha values to reflect a determination that the second alpha values have at most two partial-transparency levels; and encode the second alpha values.

* * * * *